United States Patent

[11] 3,545,626

[72] Inventor Edward Seiz
       136 E. 3rd St., Lansdale, Pennsylvania 19446
[21] Appl. No. 728,182
[22] Filed May 10, 1968
[45] Patented Dec. 8, 1970

[54] STORAGE STRUCTURE
     13 Claims, 22 Drawing Figs.
[52] U.S. Cl. ..................................................... 211/176, 287/189.36
[51] Int. Cl. ..................................................... A47f 5/10
[50] Field of Search .......................................... 211/176, 177, 148; 85/5(Cursory); 151/33(Cursory), 41(Cursory); 287/136(E), 189.36(US)

[56] References Cited
     UNITED STATES PATENTS

| | | | |
|---|---|---|---|
| 826,186 | 7/1906 | McSpadden et al. ......... | 151/41X |
| 826,584 | 7/1906 | Lehman ........................ | 151/33 |
| 1,044,055 | 11/1912 | Johnson et al. ................ | 287/136E |
| 2,902,166 | 9/1959 | Bahr .............................. | 211/177X |
| 3,054,511 | 9/1962 | Erismann ...................... | 211/176 |
| 3,070,237 | 12/1962 | Fullerton et al. ............... | 211/176 |
| 3,144,944 | 8/1964 | McConnell ..................... | 211/148 |
| 3,376,779 | 4/1968 | Sol ................................. | 85/5 |
| 3,414,224 | 12/1968 | Robilliard et al. ............ | 211/176X |

FOREIGN PATENTS

| | | | |
|---|---|---|---|
| 916,961 | 1/1963 | Great Britain ................ | 211/148 |

Primary Examiner—Thomas F. Callaghan
Attorney—Howson and Howson

ABSTRACT: A storage structure including at least two uprights and a cross beam releasably and adjustably mounted on said uprights. The front plates of the uprights have a series of holes at spaced intervals along their length and the beam is supported by a support clip having pins snugly received in the holes by axial engagement therein. A clip is anchored against displacement from the holes by a latch element having a portion passing through a free hole and engaging behind the front plate to prevent outward displacement of the clip. A novel box beam structure formed by interlocking two channel members without separate fasteners or welded connections.

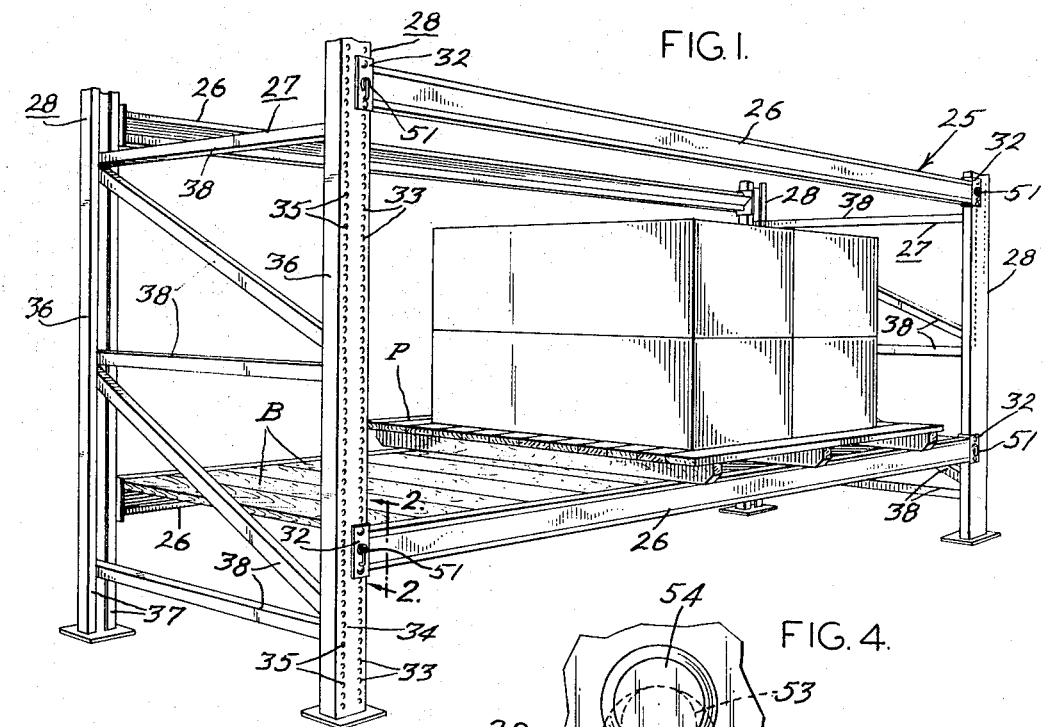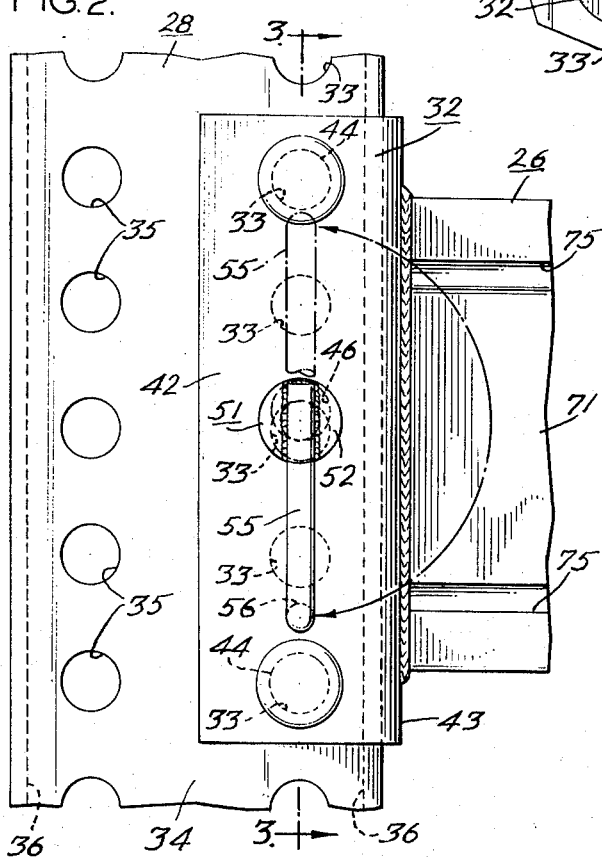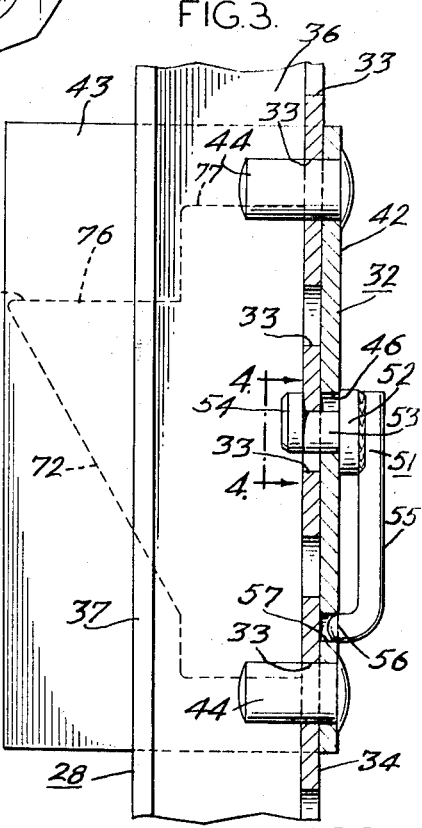

PATENTED DEC 8 1970
3,545,626
SHEET 2 OF 4
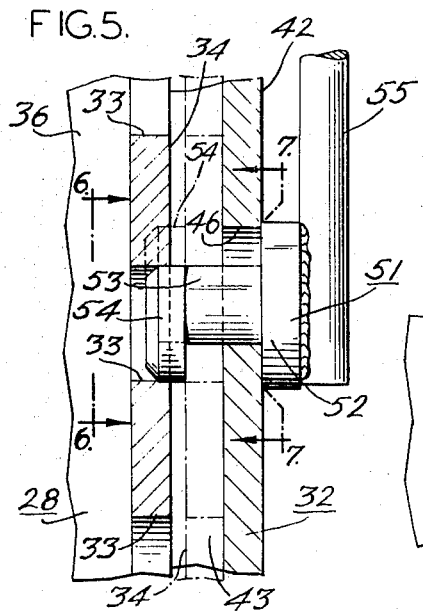
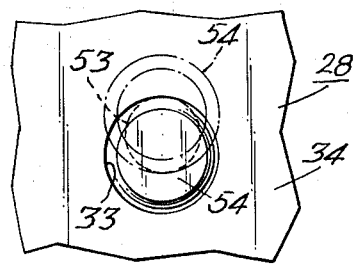
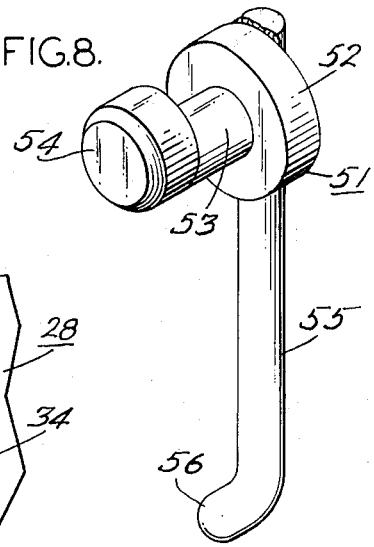
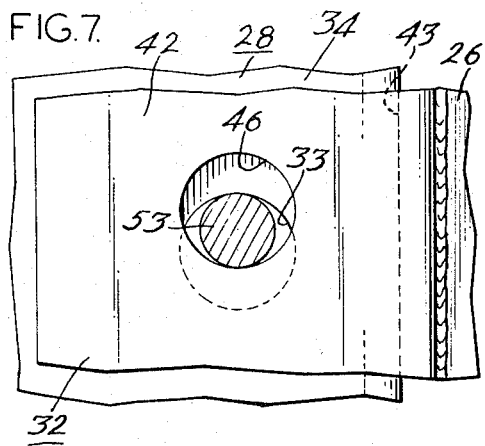
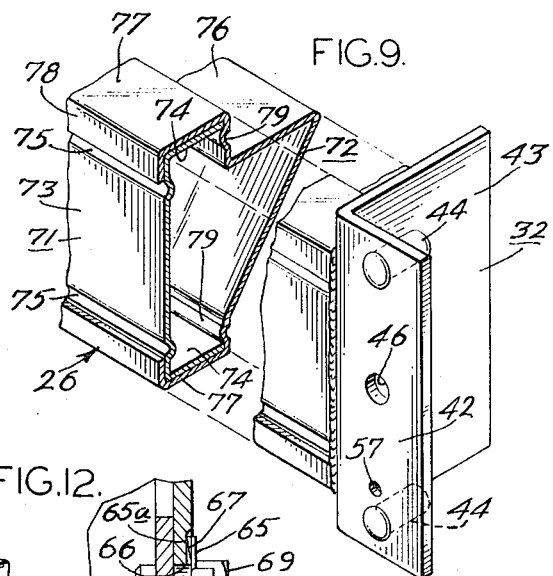
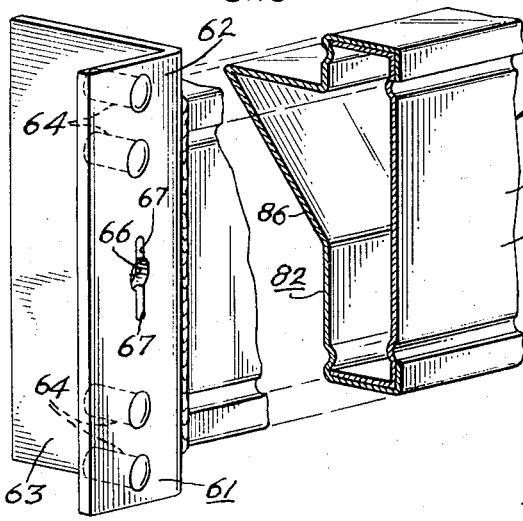
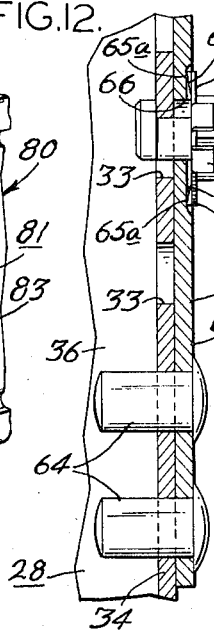
INVENTOR:
EDWARD A. SEIZ
BY Howson & Howson
ATTYS.

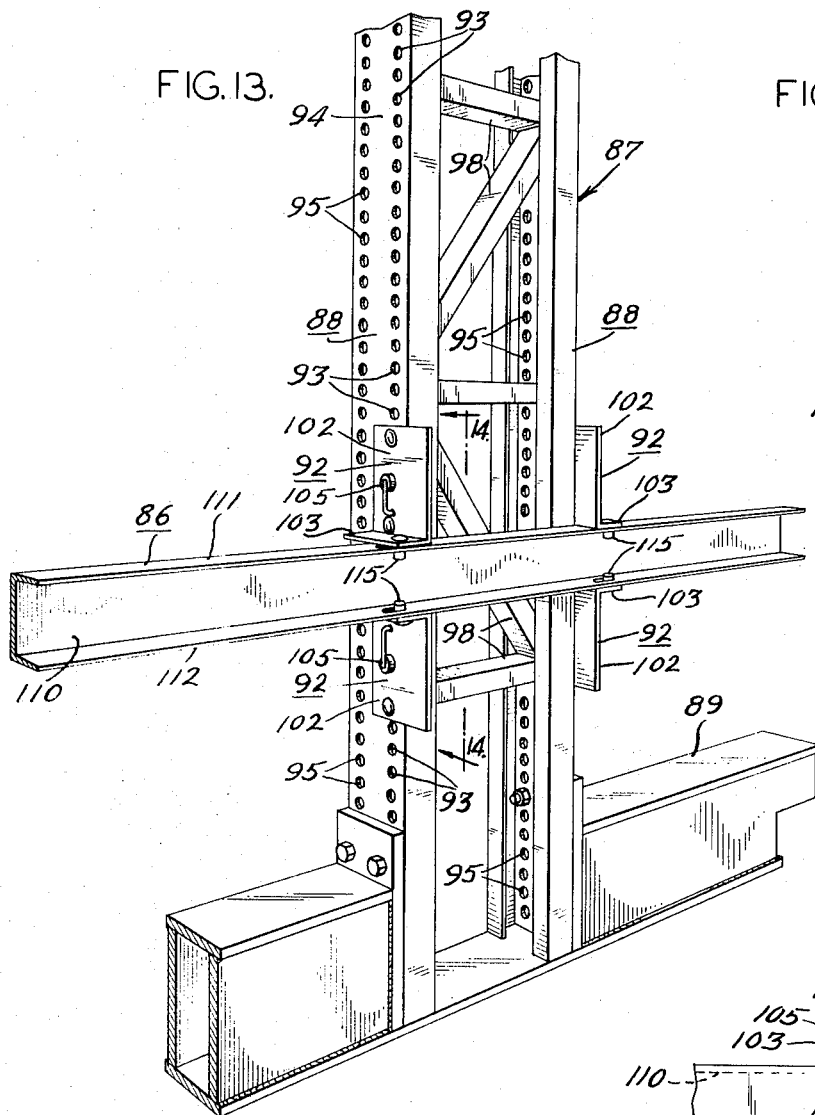
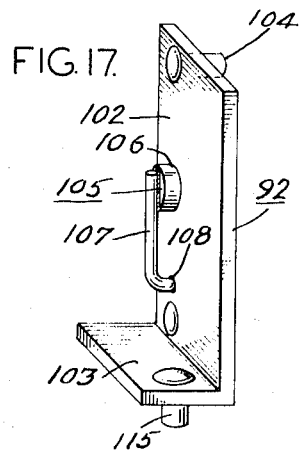
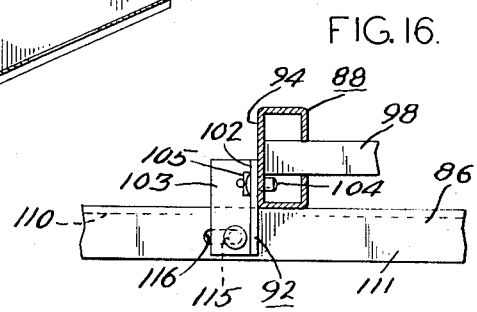
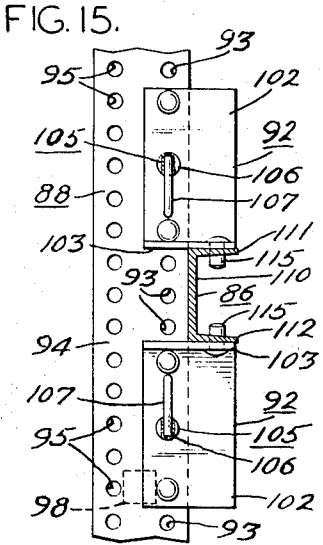
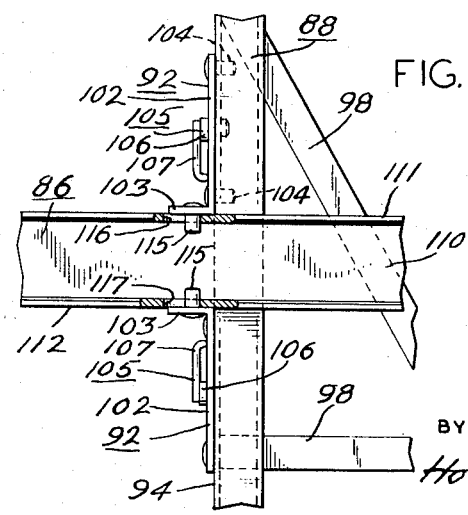

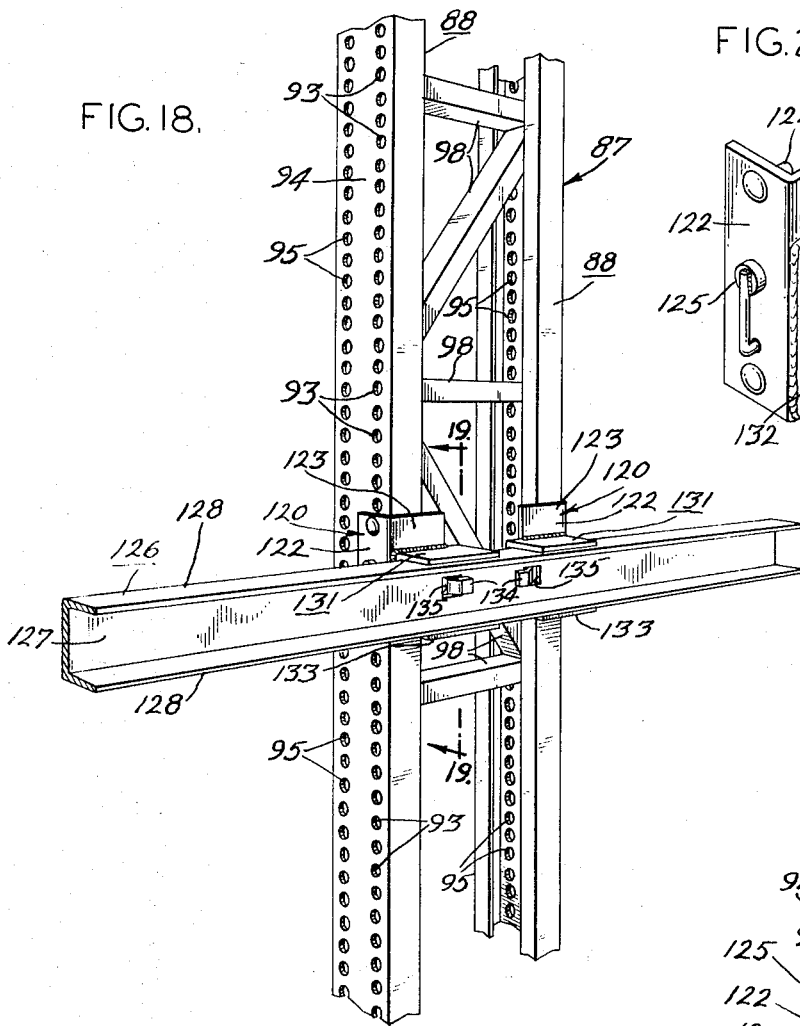
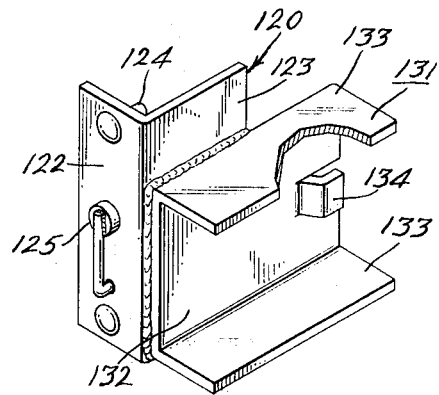
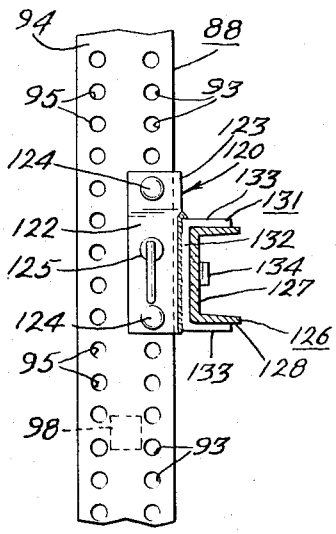
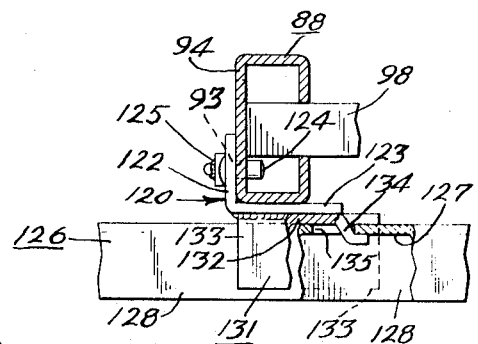
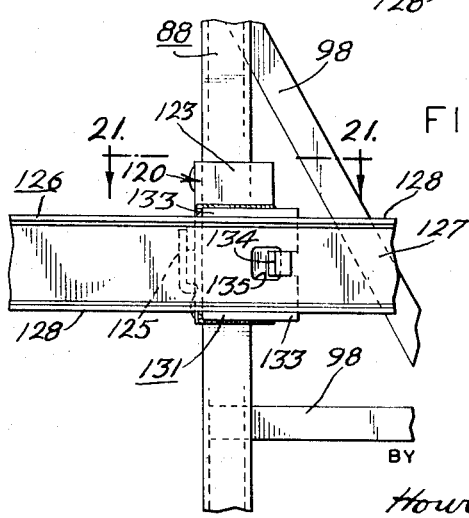

3,545,626

STORAGE STRUCTURE

The present invention relates to storage structures and has particular application to knockdown devices for use in warehouses, stock rooms, and the like, to store various materials thereon.

The present invention is an improvement upon the structure shown in my U.S. Pat. No. 3,337,062, in which a coupling element has pin means adapted to engage in apertures in an upright by displacement of the element axially of the pin means, and includes a latch operable to engage behind the upright to prevent inadvertent displacement. This patented structure is highly effective in that it permits straight-in assembly of the coupling element to the upright, avoiding the rocking movement which is typical of prior knockdown rack structures. This type of assembly provides a snug mounting which is not easily disassembled by inadvertent impacts upon the structure by load-handling equipment. The patented structure also provides a greater range of vertical adjustability by reason of the fact that the holes, being circular rather than elongated, may be located on smaller centers than in prior racks. While racks of this character are entirely satisfactory for many installations, it has been found that there are limitations because of the requirement that each coupling element be designed to mate with an upright of a specified dimensions. Accordingly, where racks of different strength are required in the same installation, it is necessary to maintain a complete inventory of uprights and mating crosspieces for each type of rack.

With the foregoing in mind, the present invention provides a novel structure embodying uprights and crosspieces in which the crosspieces have support clips which are capable of mating with a wide variety of uprights, and uprights which are capable of mating with a wide variety of crosspieces, thereby enabling a substantial reduction in the inventory required in a particular installation.

Another object of the present invention is to provide a simplified storage structure capable of applications in confined quarters wherein there is limited accessibility.

More particularly, the present invention provides an improved assembly in which the support clips are assembled to the upright by straight-in assembly from the face and are locked in place by a locking device on the same face.

The present invention in addition includes a locking device which retains the clip assembled to the upright, not only by frictional or gravity engagement but also by a positive latch. The locking device is preferably a separate element so as to afford replacement in the event of damage without need for replacing the support clip or the upright.

Another object of the invention is to provide an improved crossbeam wherein a box beam is formed by interengaging two channel members with simple rolling or bending operations.

In summary, the present invention provides a support structure having a series of holes in one plate thereof in which support clips may be adjustably mounted to support a crossbeam. The support clips have pins fitting snugly in the holes of the series when axially engaged therein and a locking element is provided to pass through another hole in said series and engage behind the plate of the upright to prevent outward displacement of said pins from said holes.

All of the objects of the invention are more fully set forth hereinafter with reference to the accompanying drawing wherein:

FIG. 1 is a perspective view of a storage structure made in accordance with the present invention wherein the crossbeams are supported at their ends by the uprights;

FIG. 2 is an enlarged face view showing the support clip, as seen from the line 2-2 in FIG. 1;

FIG. 3 is a sectional view taken on the line 3-3 of FIG. 2;

FIG. 4 is an enlarged fragmentary rear elevational view, as seen on line 4-4 of FIG. 3;

FIG. 5 is an enlarged fragmentary sectional view similar to FIG. 3, but illustrating the disassembly of the support clip from the upright;

FIG. 6 is a fragmentary rear elevational view similar to FIG. 4, but taken on the line 6-6 of FIG. 5;

FIG. 7 is a sectional view taken on the line 7-7 of FIG. 5;

FIG. 8 is a detached perspective view of the locking element shown in the previous FIGS.;

FIG. 9 is a fragmentary perspective view of the crossbeam and the support clip removed from the upright and illustrating the formation thereof;

FIG. 10 is a view similar to FIG. 9 illustrating a modified crossbeam and support clip which may be substituted for the beam shown in FIG. 9;

FIG. 11 is a perspective view similar to FIG. 8 of a locking element which may be used with the clip of FIG. 10;

FIG. 12 is a fragmentary sectional view similar to FIG. 3 showing the assembly of the clip of FIG. 10 to an upright by the element of FIG. 11;

FIG. 13 is a fragmentary perspective view of a storage structure wherein the crossbeam is supported by uprights intermediate the ends thereof, cantilever fashion;

FIG. 14 is a fragmentary view in side elevation, with portions broken away, as seen from the line 14-14 of FIG. 13;

FIG. 15 is an end elevational view as seen from the left-hand end of FIG. 14;

FIG. 16 is a plan view as seen from the top of FIG. 14;

FIG. 17 is a detached perspective view of the support clip shown in FIGS. 13 to 16 inclusive;

FIG. 18 is a fragmentary perspective view of a storage rack similar to that shown in FIG. 13, but with a different form of support clip;

FIG. 19 is a fragmentary view in side elevation as seen from the line 19-19 of FIG. 18;

FIG. 20 is a view as seen from the left-hand end of FIG. 19;

FIG. 21 is a fragmentary sectional view with portions broken away taken on the line 21-21 of FIG. 19; and FIG. 22 is a detached perspective view of the support clip shown in FIGS. 18 through 21.

Referring now to the embodiment of the invention shown in FIGS. 1 to 9 inclusive, the storage structure comprises a rack 25 including crossbeams 26 supported at their ends by end structures 27 including a pair of uprights 28. The storage articles may be supported on a pallet P extending between the front and rear crossbeams, or may rest on shelf boards B which span between the front and rear crossbeams.

In accordance with the invention, the crossbeams 26 are adjustably mounted on the uprights 28 by support clips 32 welded to the ends of the beams 26 and adapted to be selectively engaged in holes 33 disposed in an equally-spaced series adjacent one edge of the front plate 34 of the upright 28. A similar series of holes 35 is provided adjacent the opposite edge of the front plate to permit the addition of a second storage section utilizing the same upright 28. As shown, the uprights 28 comprise reinforced channels generally U-shaped in construction having flanges 36 extending rearwardly from the front plate 34 and terminating in inturned legs 37. The end structure also includes struts 38 fitting between the inturned legs 37 and welded to the uprights 28 to form the rigid end structure 27. As is well known, to increase the strength of the uprights, the flanges 36 and the face plate 34 may be widened as required. Regardless of the width of these members, the series of holes 33 will be aligned on a center line parallel to, and having a fixed spacing from the outer surface of the flange adjacent thereto so that a wide variety of uprights may mate with the same support clip 32.

The support clip 32 is designed to provide a firm interlock with the upright 28. To this end, the support clip 32 comprises an angle member having a front flange 42 adapted to overlie the front plate 34 of the upright and a side support flange 43 adapted to overlie the side flange 36 of the upright. Rearwardly projecting pins 44 are provided on the front flange 42 to engage in spaced holes 33 of the series of holes in the upright. In the present instance, the pins 44 span five holes 33 to provide a wide base of interengagement between the pins 44 and holes 33. The pins 44 are on a center line spaced from the inner surface of the flange 43 a distance corresponding to the spacing of the center line of the holes 33 from the outer surface of the flange 36. In this manner, a snug engagement of the clip 32 with the upright 28 is obtained by displacement of the clip axially of the pins 44 inwardly until the front flange 42 engages flush against the front face of the plate 34 of the upright. Because of the snug fit of the pins 44 in the holes 33, the clip 32 supports the beam 26 against vertical displacement in either the upward or downward direction.

Lock means is provided to prevent outward displacement of the clip 32 from the holes 33. To this end, the front flange 42 of the clip is provided with a hole 46 of a size corresponding to the holes 33 (see FIG. 9). With the pins 44 engaged as shown in FIG. 3, the hole 46 overlaps the central hole 33 but is eccentric thereto as more clearly shown in FIG. 7. A locking element 51 passes through the overlapping holes 46 and 33 to interlock the clip 32 to the upright 28. As shown in FIG. 8, the locking element 51 includes a base portion 52 adapted to engage flush against the outer surface of the flange 42, an inwardly projecting shank 53 of a diameter to pass through the overlapping portions of the holes 33 and 46, and a cylindrical head 54 preferably of a diameter corresponding to the diameter of the holes 33 and 46 and eccentric to the shank 53 as shown in FIG. 8.

As shown in FIG. 3, with the locking element 51 in locked position, the head 54 engages behind the front plate 34 of the upright and the base 52 engages against the front face of the front flange 42 to thereby retain the flange 42 flush against the front face of the plate 34. To release the lock, the locking element 51 is rotated 180° as shown in FIG. 5 so as to rotate the head 54 into registry with the holes 33 permitting outward displacement of the clip 32 and disengagement of the pins 44 from the holes 33.

If it is desired to disengage the locking element 51 from the clip 32, after removal of the clip from the upright, the locking element is displaced to register the head 54 with the hole 46 permitting axial withdrawal of the locking element from the clip. To facilitate operation of the locking element, a latching operator arm 55 is mounted on the base 52. The operator 55 is oriented with respect to the head 54 so that when the operator is at the six o'clock position shown in full lines in FIG. 2, the head 54 locks the clip to the upright. When the operator is in the twelve o'clock position shown in broken lines in FIG. 2, the head 54 is in registry with the hole 33 and unlocks the clip from the upright. The weight of the arm 55 is sufficient to operate the lock by gravity so that the force of gravity tends to resist unlocking movement. To further insure against inadvertent unlocking of the clip, latching means is provided. To this end, the arm 55 has an inturned end portion 56 and the arm is of sufficient length to exhibit a degree of resilience. In the locked position, the end 56 engages in a keeper 57 in the clip 32 (see FIGS. 3 and 9) so that to unlock the clip, the arm 55 must be displaced outwardly to disengage the clip 56 from the keeper 57 before the arm may be rotated to unlock the structure.

The clip of the present invention may be modified when used to support heavier structural crossbeams. For example, as shown in FIGS. 10 and 12, a modified clip 61 is illustrated therein having a front flange 62 and a side flange 63. To provide a greater load-bearing capacity, four pins 64 project rearwardly from the front flange 62 to engage in holes of an upright. The pins 64 are disposed in the flange 62 in a manner similar to the pins 44 so that the clip 61 may be engaged on the same upright that the clip 32 engages. A hole 66 is provided in the front flange 62 to accommodate a locking element and keeper slots are provided at 67. In other respects, the clip 61 is similar to the clip 32 and is interchangeable therewith.

The hole 66 and slots 67 are designed to cooperate with a locking device 68 as shown in FIG. 11. The locking element 68 is similar to the element 51, but the base 69 is formed of hexagonal shape to accommodate a standard hex wrench and the latching operator 55 is replaced by a spring washer 70 mounted on the shank to interlock with the base 69. The washer 70 has spring tabs 65 with pressed-in ribs 65a to engage in the keeper slots 67 on the front flange 62. The substitution of the spring washer 70 for the spring arm 55 provides a more compact assembly which affords greater utilization of the space, without sacrificing the desirable features of the structure shown in the previous embodiment. The compact construction also permits the use of multiple locking devices without interference therebetween in a clip of limited length.

In the foregoing description, it is apparent that the clip 32 is adapted to be mounted on a plurality of uprights which have a series of holes in a front plate at a fixed spacing from the side flanges of the upright. Furthermore, the insertion and locking of the clip into the holes of the upright is accomplished from the front and there is no requirement for access to the rear of the upright in order to assemble or disassemble the clip to the upright. Thus, the clip may be assembled to the upright in installations where the uprights are confined in a location where access is limited. The straight-in assembly provides a snug interengagement which resists both upward and downward vertical thrusts upon the crossbeams and in the event of damage to the locking member 51, it may be easily disassembled from the clip and replaced. The locking member 51 is designed for clips and uprights of a specific gauge, and if the gauges change, a different locking member having the proper length of shank 53 may be used in place of the original member.

The clip of the present invention adapts itself to crossbeams of improved construction. As best shown in FIG. 9, the crossbeam 26 is a box beam formed of front and back pressed-out components 71 and 72 respectively. The front component 71 is of channel form having a front web 73 and rearwardly extending flanges 74. Stiffening ribs 75 are pressed inwardly of the front web 73. The rear component 72 is of modified channel construction having a rear web 76 pressed rearwardly in the form of an angular step as shown. Forwardly projecting flanges 77 are provided to overlap the flanges 74 of the forward component and the terminal edges of the flanges 77 are pressed or rolled down to overlie the front web 73 as indicated at 78. Stiffening ribs 79 are pressed-in adjacent the flanges 77 and serve to confine the free edges of the flanges 74 against the flanges 77. It is apparent that the composite beam produced by the interengagement of the front and rear components 71 and 72 may be assembled into a unitary structure by simple bending operations without the need for welds or other fasteners. When the composite beam is welded to the support flanges 43 of the clips 32 at either end, a strong and rigid box beam assembly is produced.

It is noted that the upper compression flanges and the lower tension flanges of the box beam are of double thickness which imparts the greater strength to the beam in the areas of greatest stress. The step formed in the rear web 76 accommodates the shelf boards B as shown in FIG. 1 and if the offsetting of the step 76 from the flange 77 is equal to the thickness of the shelfboards B, the flange 77 is flush with the top of the boards. The triangular form of the step provides a strong support for the shelving with minimum use of skill. A similar beam is shown at 80 in FIG. 10. The beam 80 is designed to accommodate greater loads by reason of its greater vertical height. In this instance, the added height is obtained by increasing the length of the web 83 of the front component 81 and increasing the length of the web 86 of the rear component 82 without modifying the configuration of the step portion. It is apparent that the beam 80 is assembled similarly to the beam 26 and is possessed of all of the advantages of the beam 26.

An alternative form of support structure is shown in FIGS. 13 to 17 inclusive. In these FIGS., the storage structure comprises a crossbeam 86 supported intermediate its ends by an end structure 87 including a pair of uprights 88. The end structure 87 is supported on a base 89 similar to the base shown in my copending application Ser. No. 674,952 filed Oct. 12, 1967.

In accordance with the invention, the crossbeams 86 are adjustably mounted on the uprights 88, cantilever fashion, by support clips 92 releasably engaged with the beam 86 and adapted to be selectively engaged in holes 93 disposed in equally-spaced series adjacent one edge of the front plate 94 of the upright 88. A similar series of holes 95 is provided adjacent the opposite edge of the front plate to permit the addition of crossbeams to the other side of the support structure 87. The uprights 88 comprise reinforced channels generally U-shaped in construction with struts 98 spanning therebetween similarly to the construction of the end structure 27 of the previously described embodiment, but of narrower depth. As in the previously described embodiment, the dimensions and configuration of the uprights 88 may be modified and still accept the support clips 92 if the spacing of the center line of the series of holes 93 from the side flange of the upright 88 is maintained constant.

The support clip 92 is designed to provide a firm interlock between the upright 88 and the crossbeam 86. To this end, the support clip 92 comprises an angle member having a front flange 102 adapted to overlie the front plate 94 of the upright and a support flange 103 adapted to engage and support the crossbeam 86. As in the previously described embodiment, rearwardly projecting pins 104 are provided on the front flange 102 to engage in spaced holes 93 of the series of holes in the upright 88. The pins 104 permit snug engagement of the clip 92 with the upright by displacement of the clip axially of the pins 104 inwardly until the front flange 102 engages flush against the front face of the plate 94 of the upright. Because of the snug fit of the pins 104 in the holes 93, the clip 92 supports the beam 86 against vertical displacement in either the upward or downward direction.

Lock means is provided to prevent outward displacement of the clip 92 from the holes 93. To this end, the front flange 102 of the clip is provided with a hole similar to the hole 46 of the previously described clip 32 which receives a locking element 105 similar in form and operation to the locking element 51 of the previously described embodiment. As shown, the locking element 105 includes a base portion 106 adapted to engage flush against the outer surface of the flange 102 when its inner head is engaged behind the front plate 94. A latching operator 107 is provided to engage in a keeper 108 in the flange 102 so that the locking member 105 partakes of all of the advantages of the locking member 51 described previously.

In this embodiment of the invention, the crossbeam 86 is of conventional channel form having an upright web 110 with an upper tension flange 111 and a lower compression flange 112. In order to provide an interlock between the clip 92 and the beam 86, the support flange 103 of the overlying clip 92 is provided with a depending pin 115 adapted to engage in slotted opening 116 in the tension flange 111. In like manner, the underlying clip 92 is provided with an upstanding pin 115 adapted to engage in slotted openings 117 in the compression flange 112. The overlying and underlying clips 92 are identical in form but are respectively right-hand and left-hand. In assembly, the underlying clips 92 are locked to the uprights 88 and the beam 86 is placed on the support flanges 103 with the pins 115 projecting through the slotted openings 117. The pins 115 of the overlying clips are then engaged in the slotted openings 116 and the clips are displaced axially of the pins 104 to cause the pins 104 to engage in the openings 93 of the upright. Upon snug engagement therein, the locking member is rotated to interlock the clips with the uprights.

By reason of the construction of the structure shown in FIGS. 13 through 17 inclusive, it is possible to erect storage structures having crossbeams of varying length and dimensions in accordance with the requirements of the load to be placed thereon. The spacing of the hole 93 in the series is such as to accommodate support beams of various width and it is a simple procedure to replace the crossbeams, as desired.

A similar support structure is shown in FIGS. 18 through 22 inclusive. In this embodiment of the invention, the support structure is identical to the structure shown in FIG. 11 and has been identified with corresponding reference numbers, but the clips are different. As shown, the uprights 88 are provided with holes 93 to accommodate support clips 120 which function similarly to the support clips 93 described above. The support clips 120 are in the form of the angle member having a front flange 122 and a support flange 123. The front flange 122 has inwardly projecting pins 124 adapted to cooperate with the holes 93 and is also provided with a locking member 125 which may be identical to the locking member 105 of the previously described embodiment.

The support clip 120 is adapted to interlock with a crossbeam 126 of a standard channel form having an upright web 127 and horizontal tension and compression flanges 128. The beam 126 is carried on the support flange 123 by a channel section 131 welded to the support flange 123 and adapted to telescopically engage the support beam 126. The channel section 131 has an upright web 132 adapted to engage flush against the web 127 and upper and lower flanges 133 adapted to engage respectively above and below the flanges 128 of the beam 126. To prevent displacement of the beam from engagement with the channel section 131, the web 132 is provided with a struck-out tongue 134 which is adapted to engage through slotted openings 135 in the web 127 of the support beam 126. As shown, the free terminal end of the tongue 134 engages behind the web 127 to retain the crossbeam 126 in telescopic engagement with the support sections 131.

It should be noted that in this embodiment of the invention, the slotted openings 135 in the web 127 are positioned along the neutral axis of the beam 126 so as to avoid diminution of the load-carrying capacity of the beam. Furthermore, the construction and arrangement of the parts provide for easy assembly and disassembly of the beam 126 with the support structure 87. To this end, the support clip 120 is engaged with one of the uprights 88 and is locked in place by the locking device 125. The beam 126 is assembled to the clip 120 by engagement of the slotted opening 135 with the tongue 134. Thereafter, the tongue 134 of the other support clip 120 is engaged in the other opening 135 and the pins 124 are then displaced axially into engagement with the holes 93 of the other upright 88, the length of the slotted opening 135 being sufficient to permit the desired axial displacement of the clip 120 with the tongue 134 in engagement with the opening. When assembled in this manner, the support beam 126 is rigidly supported on the support structure 87 in a simple and effective manner, providing a wide range of adjustability.

The support clips of the structures shown in the embodiments illustrated in FIGS. 10 through 22 inclusive are possessed of the advantages of the support clips shown and described in connection with the embodiment of FIGS. 1 to 9, particularly in providing wide interchangeability of parts thereby reducing the required inventory in storage warehouses and the like. It is apparent that the simple channel support beams may be substituted for the box support beams of the first embodiment, and conversely the channel beams of the latter embodiments may be replaced by the box beam of the first embodiment.

While particular embodiments of the present invention have been herein illustrated and described, it is not intended to limit the invention to such disclosure but changes and modifications may be made therein and thereto within the scope of the following claims.

I claim:
1. In a storage structure having at least two uprights and a crossbeam releasably and adjustably mounted on said uprights, each of said uprights having a front plate with a series of holes equally spaced along one side thereof, the improvement including a support clip mounting said crossbeam on each upright, said support clip comprising an angle member having a front flange adapted to overlie the front plate of the upright and a support flange for supporting the crossbeam, said front flange having a plurality of pins with a spacing corresponding to the spacing of said holes and at least one of said pins having a cross-sectional area substantially equal to the area of its associated hole, said one pin adapted to be snugly engaged in said hole by displacement of said clip axially of said pins to prevent vertical displacement of said clip, and a locking device removably carried by said front flange and adapted to pass through one of said series of holes, said locking device being rotatable on an axis normal to the plane of said front flange into engagement behind said front plate adjacent said one hole to thereby lock said clip against inadvertent displacement from said upright.

2. A support structure according to claim 1 wherein said front flange has a hole in at least partial registry with said one hole of the upright, said locking device comprising a base portion adapted to engage against the front face of said front flange, a shank portion adapted to pass through said registering holes, and a head portion adapted to engage behind said front plate to thereby lock said front flange in flush engagement with said front plate.

3. A support structure according to claim 2 wherein said registering holes in the front plate and the front flange are eccentric, and said head of the locking device is eccentric to its shank whereby said device may be rotated between a releasing position in which said head is in registry with the one hole in said front plate and a second locking position wherein said head is out of registry with said hole to engage behind the front plate.

4. A storage structure according to claim 3 wherein said front angle includes keeper means, and said locking device includes a spring biased latching element engageable with said keeper means when said locking element is in its locked position to restrain angular displacement of said locking element out of its locked position.

5. A storage structure according to claim 4 wherein said locking element comprises an arm secured to said locking member having an inturned free end portion and said keeper comprises a hole in said front plate adapted to receive said inturned free end portion.

6. A storage structure according to claim 4 wherein said latching element comprises a spring tab carried by said locking element and having a latching rib thereon, and said keeper comprises a slot in said flange adapted to receive the rib of said spring tab when said locking element is in its locked position.

7. A storage structure according to claim 1 wherein said crossbeam is supported on said clip by welding to said support flange.

8. A storage structure according to claim 7 wherein said support beam comprises a box beam formed of front and back pressed-out components of channel form with upright webs, and flanges extending perpendicularly to said web, the flanges of one of said components being shorter than the flanges of the other said component and being adapted to be received therebetween, the terminal portion of the flanges of said other components being inturned against the web of said one component to interlock said components.

9. A storage structure according to claim 8 wherein the web of said other component is provided with a stiffening rib pressed inwardly in the web adjacent each flange thereof, the terminal end of each flange of the one component being received between the one rib and the adjacent flange and held therebetween by the interlock provided by the inturned terminal end portions, the web of said other component being formed as an angular step offset downwardly from the top flange, so that the application of a downward load on the step tends to effect a tight interengagement of the top flanges.

10. A storage structure according to claim 1 wherein said support flanges of the support clips are disposed horizontally and said support beam is releasably engaged on said horizontal support flanges, and pin means projecting vertically from said support flanges to releasably retain said support beam thereon.

11. A storage structure according to claim 1 wherein said support flange is provided with a channel section having a vertical web and spaced horizontal flanges, said support beam adapted to be telescopically engaged intermediate said flanges, and means to retain said support beam in telescopic engagement.

12. A storage structure according to claim 11 wherein said support beam has a vertical web adapted to engage flush against the vertical web of said channel section and having slotted openings therein, said retaining means comprising a tongue projecting from the web of said channel section through said slots to retain said support beam telescopically engaged with said sections.

13. In a storage structure, at least one upright having a front plate with a series of holes equally spaced therealong;
a support clip releasably and adjustably mounted on said upright comprising a member having a front flange adapted to overlie the front plate of the upright, said front flange having a plurality of pins with a spacing corresponding to the spacing of said holes and adapted to engage in said holes, and a hole in said flange eccentric to and in partial registry with another hole of the upright;
a locking device comprising a base portion adapted to engage against the front face of said front flange, a shank portion adapted to pass through the registering portions of said holes and rotatable on an axis midway between the axes of said eccentric holes, and a head portion adapted to engage behind said front plate to thereby lock said front flange in flush engagement with said front plate; and
said head portion being eccentric to the shank portion whereby said device may be rotated between a releasing position in which said head is in registry with said other hole in said front plate and a second locking position wherein said head is out of registry with said hole to engage behind the front plate.